(12) United States Patent
Roy et al.

(10) Patent No.: US 7,463,626 B2
(45) Date of Patent: *Dec. 9, 2008

(54) PHASE AND FREQUENCY DRIFT AND JITTER COMPENSATION IN A DISTRIBUTED TELECOMMUNICATIONS SWITCH

(76) Inventors: Subhash C. Roy, 36 Bertwell Rd., Lexington, MA (US) 02420; David K. Toebes, 4 Brundett Ave., Andover, MA (US) 01810; Michael M. Renault, 40 Ellis St., Medway, MA (US) 02053; Steven E. Benoit, 12 Bramel Cir., Walpole, MA (US) 02081; Igor Zhovnirovsky, 51 Cynthia Rd., Newton Center, MA (US) 02459

( * ) Notice: Subject to any disclaimer, the term of this patent is extended or adjusted under 35 U.S.C. 154(b) by 491 days.

This patent is subject to a terminal disclaimer.

(21) Appl. No.: 10/155,517

(22) Filed: May 24, 2002

(65) Prior Publication Data

US 2003/0091035 A1 May 15, 2003

Related U.S. Application Data

(63) Continuation-in-part of application No. 09/717,440, filed on Nov. 21, 2000, now Pat. No. 6,631,130.

(51) Int. Cl.
 *H04L 12/56* (2006.01)
(52) U.S. Cl. .................................. 370/388; 370/395.42
(58) Field of Classification Search ................. 370/352, 370/353, 400, 401, 386, 387, 388, 389, 395.1, 370/396, 395.7, 462, 463, 395.21, 503, 507, 370/516, 518, 522, 395.42
See application file for complete search history.

(56) References Cited

U.S. PATENT DOCUMENTS

| | | | | |
|---|---|---|---|---|
| 4,679,190 | A | * | 7/1987 | Dias et al. ................... 370/355 |
| 5,396,491 | A | * | 3/1995 | Newman ..................... 370/355 |
| 5,748,629 | A | | 5/1998 | Caldara et al. .............. 370/389 |
| 5,844,887 | A | | 12/1998 | Oren et al. ................... 370/218 |
| 5,870,538 | A | | 2/1999 | Manning et al. .............. 714/42 |
| 5,905,729 | A | | 5/1999 | Gaddis et al. ............... 370/399 |
| 5,909,429 | A | | 6/1999 | Satyanarayana et al. .... 370/254 |
| 5,949,778 | A | * | 9/1999 | Abu-Amara et al. ........ 370/388 |
| 6,078,595 | A | * | 6/2000 | Jones et al. ................. 370/503 |
| 6,097,776 | A | * | 8/2000 | Mesiwala ................... 375/355 |
| 6,128,319 | A | * | 10/2000 | Ngai .......................... 370/516 |
| 6,151,301 | A | | 11/2000 | Holden ....................... 370/232 |
| 6,169,749 | B1 | | 1/2001 | Dove et al. ................. 370/474 |

(Continued)

*Primary Examiner*—Brian D Nguyen
(74) *Attorney, Agent, or Firm*—Schwabe, Williamson & Wyatt, P.C.

(57) ABSTRACT

Methods and apparatus for phase and frequency drift and jitter compensation in a distributed switch which carries both TDM and packet data are disclosed. The methods include the insertion of programmable fill times at different stages of the switch to allow buffers to fill, driving service processors (line cards) with different clocks and synchronizing the service processors (line cards) to the switch fabric, providing redundant switch fabric clocks and methods for automatically substituting one of the redundant clocks for a clock which fails, providing redundant switch fabrics each having a different clock and methods for automatically substituting one switch fabric for the other when one fails. The apparatus of the invention includes a plurality of service processors (line cards), switch elements and clock generators. An exemplary clock generator based on an FPGA is also disclosed.

7 Claims, 13 Drawing Sheets

U.S. PATENT DOCUMENTS

| | | | |
|---|---|---|---|
| 6,240,087 B1 | 5/2001 | Cummings et al. | 370/360 |
| 6,256,361 B1 * | 7/2001 | Mozetic et al. | 375/360 |
| 6,351,474 B1 * | 2/2002 | Robinett et al. | 370/486 |
| 6,359,859 B1 | 3/2002 | Brolin et al. | 370/218 |
| 6,363,078 B1 * | 3/2002 | Garcia et al. | 370/438 |
| 6,414,141 B1 * | 7/2002 | Federsel et al. | 540/324 |
| 6,516,422 B1 * | 2/2003 | Doblar et al. | 713/503 |
| 6,526,448 B1 * | 2/2003 | Blewett | 709/238 |
| 6,636,467 B1 * | 10/2003 | Taussig | 369/47.3 |
| 6,640,248 B1 * | 10/2003 | Jorgensen | 709/226 |
| 6,675,307 B1 * | 1/2004 | Heitkamp et al. | 713/401 |
| 6,898,211 B1 * | 5/2005 | Lau et al. | 370/503 |
| 6,980,618 B1 * | 12/2005 | Chou et al. | 375/371 |
| 7,023,833 B1 * | 4/2006 | Aiello et al. | 370/348 |

\* cited by examiner

PHASE AND FREQUENCY DRIFT AND JITTER COMPENSATION IN A DISTRIBUTED TELECOMMUNICATIONS SWITCH

This application is a continuation-in-part of application Ser. No. 09/717,440 filed Nov. 21, 2000, entitled "A Method for Switching ATM, TDM, and Packet Data Through a Single Communications Switch While Maintaining TDM Timing", now U.S. Pat. No. 6,631,130, the complete disclosure of which is hereby incorporated by reference herein.

BACKGROUND OF THE INVENTION

1. Field of the Invention

The invention relates to telecommunications networks. More particularly, the invention relates to a method for switching ATM, TDM, and packet data through a single telecommunications network switch. Most particularly, the invention relates to methods and apparatus for phase and frequency drift and jitter compensation in a distributed switch which carries both TDM and packet data.

2. State of the Art

One of the earliest techniques for employing broadband telecommunications networks was called time division multiplexing (TDM). The basic operation of TDM is simple to understand. A high frequency signal is divided into multiple time slots within which multiple lower frequency signals can be carried from one point to another. The actual implementation of TDM is quite complex, however, requiring sophisticated framing techniques and buffers in order to accurately multiplex and demultiplex signals. One North American standard utilizing TDM (known as T1 or DS1) has twenty-four interleaved channels together having a rate of 1.544 Mbits/sec. A European standard utilizing TDM is known as E-1 and has thirty interleaved channels having a rate of 2.048 Mbits/sec. A hierarchy of multiplexing is based on multiples of the T1 or E-1 signal, one of the most common being T3 or DS3. A T3 signal has 672 channels, the equivalent of twenty-eight T1 signals. TDM was originally designed for voice channels. Today, however, it is used for both voice and data.

An early approach to broadband data communication was called packet switching. One of the differences between packet switching and TDM is that packet switching includes methods for error correction and retransmission of packets which become lost or damaged in transit. Another difference is that, unlike the channels in TDM, packets are not necessarily fixed in length. Further, packets are directed to their destination based on addressing information contained within the packet. In contrast, TDM channels are directed to their destination based on their location in the fixed frame. Today, a widely used packet switching protocol is known as IP (Internet Protocol).

More recently, broadband technologies known as ATM and SONET have been developed. The ATM network is based on fixed length packets (cells) of 53-bytes each (48-bytes payload with 5-bytes overhead). One of the characteristics of the ATM network is that users contract for a quality of service (QOS) level. Thus, ATM cells are assigned different priorities based on QOS. For example, constant bit rate (CBR) service is the highest priority service and is substantially equivalent to a provisioned TDM connection. Variable bit rate (VBR) service is an intermediate priority service which permits the loss of cells during periods of congestion. Unspecified bit rate (UBR) service is the lowest priority and is used for data transmission which can tolerate high latency such as e-mail transmissions.

The SONET network is based on a frame of 810-bytes within which a 783-byte synchronous payload envelope (SPE) floats. The payload envelope floats because of timing differences throughout the network. The exact location of the payload is determined through a relatively complex system of stuffs/destuffs and pointers. In North America, the basic SONET signal is referred to as STS-1 (or OC-1). The SONET network includes a hierarchy of SONET signals wherein up to 768 STS-1 signals are multiplexed together providing the capacity of 21,504 T1 signals (768 T3 signals). STS-1 signals have a frame rate of 51.84 Mbit/sec, with 8,000 frames per second, and 125 microseconds per frame. In Europe, the base (STM-1) rate is 155.520 Mbit/sec, equivalent to the North American STS-3 rate (3*51.84=155.520), and the payload portion is referred to as the virtual container (VC). To facilitate the transport of lower-rate digital signals, the SONET standard uses sub-STS payload mappings, referred to as Virtual Tributary (VT) structures. (The ITU calls these Tributary Units or TUs.) Four virtual tributary sizes are defined: VT-1.5, VT-2, VT-3 and VT-6. VT-1.5 has a data transmission rate of 1.728 Mbit/s and accommodates a T1 signal with overhead. VT-2 has a data transmission rate of 2.304 Mbit/s and accommodates an E1 signal with overhead. VT-3 has a data transmission rate of 3.456 Mbit/s and accommodates a T2 signal with overhead. VT-6 has a data transmission rate of 6.912 Mbit/s and accommodates a DS2 signal with overhead.

Each of the above described broadband technologies can be categorized as TDM, ATM, or Packet technologies, with SONET being a complex form of TDM. From the foregoing, it will be appreciated that TDM, ATM and Packet each have their own unique transmission requirements. Consequently, different kinds of switches are used to route these different kinds of signals. In particular, TDM requires careful time synchronization; ATM requires careful attention to the priority of cells and QOS; and packet (e.g. IP) requires the ability to deal with variable length packets. For these reasons, switching technologies for TDM, ATM, and variable length packet switching have evolved in different ways. Service providers and network designers have thus been forced to deal with these technologies separately, often providing overlapping networks with different sets of equipment which can only be used within a single network.

From the foregoing, it will be appreciated that TDM and ATM both present timing issues which are somewhat different. In TDM, the signal must remain relatively synchronized at each point in the network so that channels may be identified to add or drop connections. In ATM, the cell header identifies the connection to which the cell belongs. Nevertheless, cells must arrive at one point in the network at approximately the same time as they are expected; otherwise quality of service will be adversely affected.

Timing differences are usually expressed as phase and frequency differences. Frequency differences result from signals which are not synchronized to a common clock. Phase differences result from signals originating at different electrical distances from the receiver.

These timing issues are present even within a network switch, particularly if the switch has a very high bandwidth. Such broadband switches are often composed of a number of cards mounted in a backplane where the electrical distance between the cards is maintained constant. Sometimes "trombone connections" (connections which are longer than they would otherwise need be) are used to equalize the electrical distance between cards. Backplane switches have other disadvantages when it comes to expansion. When a switch is initially installed in the network switching office, it is desirable that the device have a small footprint. Devices are connected to each other via overhead cabling which passes from floor to floor. When it is time to expand one of the devices, it may be necessary to locate the expansion component several hundred meters of cabling away from the original device. In some cases, if components are on different floors, there may be a kilometer of cable connecting them.

The previously incorporated parent application discloses a network switch which includes at least one port processor (also referred to as a "service processor") and at least one switch element. The service processor (line card) has a SONET OC-x (SONET/SDH STS-x/STM-y) interface (for TDM traffic), a UTOPIA and UTOPIA-frame based interface (for ATM and packet traffic), and an interface to the switch element. An exemplary service processor (line card) has a total I/O bandwidth equivalent to a SONET OC-48 signal. An exemplary switch element has 12×12 ports and supports a total bandwidth of 30 Gbps.

A typical switch according to the parent application includes multiple service processors (line cards) and multiple switch elements. For a 48×48 "folded" switch, 48 service processors (line cards) are coupled (four each) to 12 (first and third stage) switch elements and each of these twelve switch elements is coupled to 8 (second stage) switch elements. A three stage non-blocking switch according to the parent application provides a total bandwidth of 240 Gbps and a five stage non-blocking switch provides a total bandwidth of 1 Tbps. An exemplary three stage folded Clos architecture switch includes forty-eight service processors (line cards) and twenty switch elements. Four service processors (line cards) are coupled to each of twelve (first and third stage) switch elements. Each of the twelve (first and third stage) switch elements are coupled to eight (second stage) switch elements.

According to the parent application, a data frame of 9 rows by 1700 slots is used to transport ATM, TDM, and Packet data from a service processor (line card) through one or more switch elements to the same or another service processor. Each frame is transmitted in 125 microseconds, each row in 13.89 microseconds. Each slot includes a four-bit tag plus a four-byte payload (i.e., thirty-six bits). The slot bandwidth (1/1700 of the total frame) is 2.592 Mbps which is large enough to carry an E-1 signal with overhead. The four-bit tag is a cross-connect pointer which is set up when a TDM connection is provisioned. The last twenty slots of the frame are reserved for link overhead. Thus, the frame is capable of carrying the equivalent of 1,680 E-1 TDM signals even though an STM-16 frame has a capacity of only 1008 E-1 signals.

For ATM and packet data, a PDU (protocol data unit) of sixteen slots is defined for a sixty-four-byte payload (large enough to accommodate an ATM cell with switch overhead). A maximum of ninety-six PDUs per row is permitted. The sixteen four-bit tags of a PDU are not needed for PDU routing so they are used as parity bits to protect the ATM or variable length packet payload. Of the sixty-four-byte payload, twelve bytes (96 bits) are used by the switch for internal routing. This leaves fifty-two bytes for actual payload which is sufficient to carry an ATM cell (without the one-byte HEC) and sufficient for larger packets after fragmentation. The PDUs are self-routed through the switch with a twenty-eight-bit routing tag which allows routing through seven switch stages using four bits per stage. The remaining sixty-eight bits of the PDU are used for various other addressing information such as indicating whether the PDU contains an ATM cell, a packet, or a control message, whether reassembly of the packet should be aborted, whether the payload is a first fragment, middle fragment or last fragment, how many payload bytes are in the last fragment, the fragment sequence count, and a destination flow identifier.

The link overhead (LOH) in the last twenty slots of the frame is analogous in function to the line and section overhead in a SONET frame. The LOH may contain a 36-bit frame alignment pattern which is used to delineate the byte and row boundaries from serial data streams, a 32-bit status register for each output link, a 32-bit switch and link identifier, and a 32-bit stuff pattern.

Since ATM and Packet traffic are typically not provisioned, bandwidth must be arbitrated among ATM and Packet connections as traffic enters the system. Moreover, since TDM traffic shares the same frame as ATM and Packet traffic, bandwidth must be arbitrated while maintaining TDM timing. According to the invention, bandwidth is arbitrated by a system of requests and grants which is implemented for each PDU in each row of the frame. The switch elements provide three channels per link, two of which are used to carry data and arbitration requests and one of which is used to carry arbitration grants. According to the disclosed preferred embodiment, a forty-eight-bit (1.5 slot) request element is generated for each PDU in the next row of the frame. Each switch element includes a single request parser and a separate request arbitration module for each output link. The request elements are generated by the service processors (line cards) and include intra-switch "hop-by-hop" routing tags and priority level information. Request elements are buffered by the switch elements and low priority request elements are discarded by a switch element if the buffer fills. Each request element which is not discarded as it travels through the switch fabric is returned to the service processor (line card) from which it originated during one "row time", i.e. 13.89 microseconds. As suggested above, requests are made "in band" interleaved with data, and grants (the returned request elements) are made "out of band" using the third channel in each link.

In order to maintain timing for TDM traffic, the V1-V4 bytes in the VT/VC frame are stripped off and the VC bytes are buffered at ingress to the switch by a service processor. The V1-V4 bytes are regenerated at the egress from the switch by a service processor. In rows having both PDU and TDM traffic, the PDUs are configured early and the TDM slots are configured late in the row.

The timing considerations for the generation of requests and grants become more complex when the switch has many stages and/or when the service processors (line cards) are located relatively large distances from the switch elements. Moreover, the maintenance of TDM timing becomes more complex if the components of the switch do not all share the same clock source.

SUMMARY OF THE INVENTION

It is therefore an object of the invention to provide methods and apparatus for phase and frequency drift and jitter compensation in a telecommunications switch.

It is also an object of the invention to provide methods and apparatus for phase and frequency drift and jitter compensation in a telecommunications switch having distributed components.

It is another object of the invention to provide methods and apparatus for phase synchronization among service processors (line cards) and switch elements of a switch fabric which allow the service processors (line cards) and the switch elements to be located relatively far apart from each other.

It is still another object of the invention to provide methods and apparatus for frequency synchronization among service processors (line cards) and switch elements of a switch fabric which allow the service processors (line cards) and the switch elements to be located relatively far apart from each other.

In accord with these objects which will be discussed in detail below, the methods of the present invention include calculating the total round trip request-grant delay from one port at one end of the switch to another port at another end of the switch based on electrical propagation delay, pipeline latency, processing time, grant delay, length of grant message and programmable fill time. According to the invention, programmable fill time is a user selected constant to allow request buffers to start filling before any requests are sent out. Although this adds to the round trip delay, it is used to ensure that the highest priority requests are forwarded at each stage of the switch fabric. According to one embodiment of the invention using optical links (1310 nm) between service processors (line cards) and switch elements, the components can be located approximately one kilometer apart with a total round trip delay of approximately 6.7 microseconds. The exact calculation depends on the distance between dual switch fabrics as described below.

The apparatus of the invention include a core reference clock, a link reference clock, and a start of row (SOR) clock. The SOR clock is distributed to each of the switch elements, but not to the service processors (line cards). Each of the switch elements and service processors (line cards) receives a core reference clock and a link reference clock. However, each of the switch elements and service processors (line cards) may receive a different frequency core reference clock and link reference clock. According to the invention, framing patterns are transmitted from the service processors (line cards) to the switch elements during initialization. The switch element closest to the sservice processor (line card) calculates the time difference between the SOR pulse and the time SOR is received from each of the service processors (line cards) and informs each service processor (line card) of the time difference. Each service processor (line card) then aligns itself with the global SOR based on the time difference reported by the switch elements.

The service processors (line cards) are coupled to the switch elements (and the switch elements are coupled to each other) by two serial data channels and one serial link grant channel. Each pair of serial data channels is referred to as a data link. A data link plus a grant channel is referred to as a port. According to other methods of the invention, the channels of each data link are synchronized to each other within ten nanoseconds with a maximum interport skew of two nanoseconds. The grant channels are synchronized with the data channels traveling in the same direction within twenty nanoseconds.

As described in the parent application, a switch according to the invention preferably has two independent switch fabrics. According to the present invention, it is not necessary, but it is preferable, that the two switch fabrics be aligned to a single SOR clock.

The maximum system span (distance between a service processor (line card) and the switch fabric is calculated according to an equation which takes into account the round trip propagation delay described above, the row time, and the SOR difference between the switch fabrics. With a five stage switch fabric, the maximum system span is 1,140 meters if the switch fabrics are equidistant from the same SOR clock. If the difference between the switch fabrics SOR is 1,000 nanoseconds, the maximum span is 940 meters.

According to a further aspect of the invention, redundant, synchronized SOR clocks are provided in case one of the SOR clocks fails, the other can take its place with little or no traffic loss.

Additional objects and advantages of the invention will become apparent to those skilled in the art upon reference to the detailed description taken in conjunction with the provided figures.

DESCRIPTION OF THE APPENDIX

Figure 1:
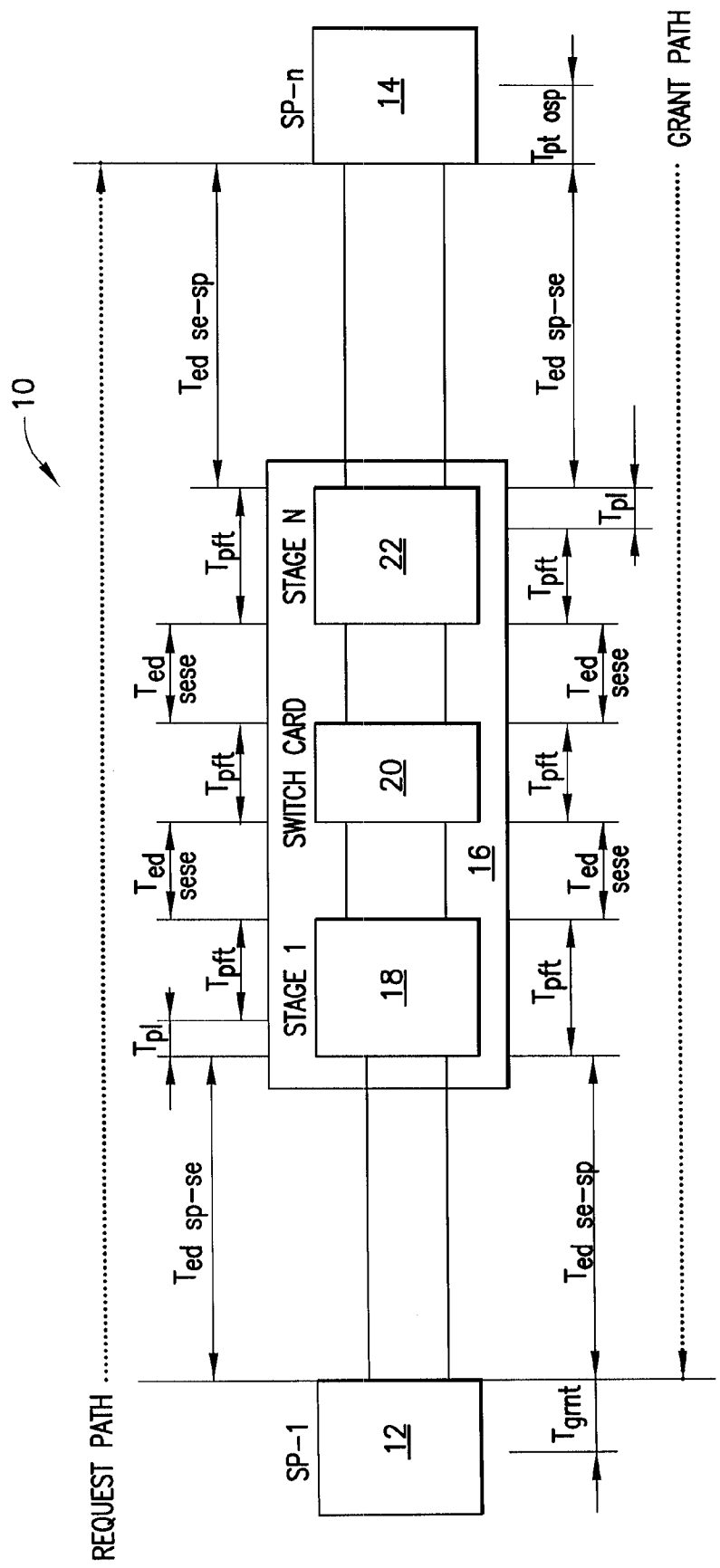
FIG. 1 is a schematic illustration illustrating arbitration propagation delay in a switch according to the invention.

The enclosed CD-ROM appendix is incorporated herein by reference. The CD-ROM is in ISO 9660 Macintosh® format and includes the following Adobe® Acrobat® files:

| List of files | Size (Bytes) | Date of Creation |
| --- | --- | --- |
| App-A.pdf | 53,816 | May 23, 2002 |
| App-B.pdf | 3,656,675 | May 17, 2002 |
| App-C.pdf | 3,052,751 | May 23, 2002 |

The file named App-A.pdf is a document entitled "iTAP Synchronization and System Clock Application Note." The file named App-B.pdf is a document entitled "OMNI Service Processor Chip Specification." The file named App-C.pdf is a document entitled "iTAP Switch Element (iTSE) Engineering Specification 'Chiron Chip'."

Table of Acronyms

For easy reference the following table of acronyms and abbreviations is provided:

| | |
| --- | --- |
| ATM | Asynchronous Transfer Mode |
| CBR | Constant Bit Rate |
| FPGA | Field programmable gate array |
| HEC | Header error check |

-continued

| | |
|---|---|
| IEEE | Institute of electrical and electronic engineers |
| IP | Internet Protocol |
| ITU | International Telecommunications Union |
| Local_Init | An initialization signal generated locally when the SOR card only is being powered up or reset |
| LOH | Link overhead |
| LVDS | Low voltage differential signal |
| Master_To_The_Other_Card | This card's internal master signal wired to the complimentary SOR card's connector |
| Master_From_The_Other_Card | The internal master signal on the complimentary SOR card wired to this card's connector |
| MSB | Most significant bit |
| OC | Optical Carrier singal |
| PDU | Protocol data unit |
| QOS | Quality of service |
| SDH | Synchronous Digital Heirarchy |
| SONET | Synchronous Optical Network |
| SOR | Start of row |
| SOR_From_The_Other_Card | The internal SOR pulse on the complimentary SOR card wired to this card's connector. This signal is not delivered to the fabric unless the other card is in master mode as described below |
| SOR_To_The_Other_Card | This card's internal SOR pulse wired to the complimentary SOR card's connector |
| SPE | Synchronous Payload Envelope |
| STM | Synchronous transfer module |
| STS | Synchronous Transport Signal |
| SYSTEM_INIT | A system-wide signal generated by the management card (system controller) when the entire system is being powered up or reset |
| TDM | Time Division Multiplexing |
| $T_{ed\ se-sp}$ | Electrical propagation delay from a switch element and a service processor |
| $T_{ed\ se-se}$ | Electrical propagation delay from a switch element to a switch element |
| $T_{ed\ sp-se}$ | Electrical propagation delay from a service processor and a switch element |
| $T_{fob}$ | Fiber optic cable time budget |
| $T_{gdl}$ | Grant delay |
| $T_{gmw}$ | Length of grant message |
| $T_{hrtpd}$ | Round trip propagation delay through hardware |
| tie_break | A system-wide signal generated by the management card when the entire system is being powered up or reset in order to determine which SOR card will function as master |
| $T_{pft}$ | Programmable fill time |
| $T_{pl}$ | Pipeline latency |
| $T_{pt\ osp}$ | Processing time for request at output service processor |
| $T_{ROW}$ | Row time |
| UBR | Unspecified Bit Rate |
| UTOPIA | Universal Test and Operations Physical Interface for ATM |
| VBR | Variable Bit Rate |
| VC | Virtual container |
| VT | Virtual tributary |

DETAILED DESCRIPTION OF THE PREFERRED EMBODIMENTS

Referring now to FIG. 1, an exemplary switch 10 according to the invention includes at least one ingress service processor (line card) 12 and at least one egress service processor (line card) 14. The service processors (line cards) are coupled to a switch fabric (switch card) 16 which is made of N stages of switch elements, e.g. 18, 20, 22. As explained in detail in the previously incorporated parent application, data is transferred through the switch in a repeating frame of 9 rows by 1700 slots. Each frame is transmitted in 125 microseconds, each row in approximately 13.89 microseconds. Each slot includes a four-bit tag plus a four-byte payload (i.e., thirty-six bits). The slot bandwidth (1/1700 of the total frame) is 2.592 Mbps which is large enough to carry an E-1 signal with overhead. The four-bit tag is a three bit pointer to the SONET J-1 or V-5 byte with one parity bit. The last twenty slots of the frame are reserved for link overhead. Thus, the frame is capable of carrying the equivalent of 1,680 E-1 TDM signals even though an STM-16 frame has a capacity of only 1008 E-1 signals. Slots which are not reserved for link overhead and which are not used for TDM traffic are arbitrated among ATM and Packet traffic. The frame is synchronized by a start of row (SOR) clock signal having a frequency of 72 KHz.

Arbitration is performed by sending a request message and receiving a grant message. The request is generated in the ingress service processor (line card) 12 and is granted by the egress service processor (line card) 14. The request is sent in band with the data channels, and grants are sent out of band in the grant channel. Arbitration through the switch is done in a pipeline fashion and must be completed in one row time, 13.89 µs. This is one of the factors for determining how far apart the service processors (line cards) can be located.

FIG. 1 illustrates the different timing considerations involved in transmitting a request through the switch and receiving a grant back through the switch. From the ingress service processor (line card) 12 to the switch card 16, there is an electrical propagation delay $T_{ed\ sp-se}$ which is greater than zero but, as explained below with reference to FIG. 5, no more than 500 ns, depending on how far the service processor (line card) 12 is from the switch card 16.

Figure 6:
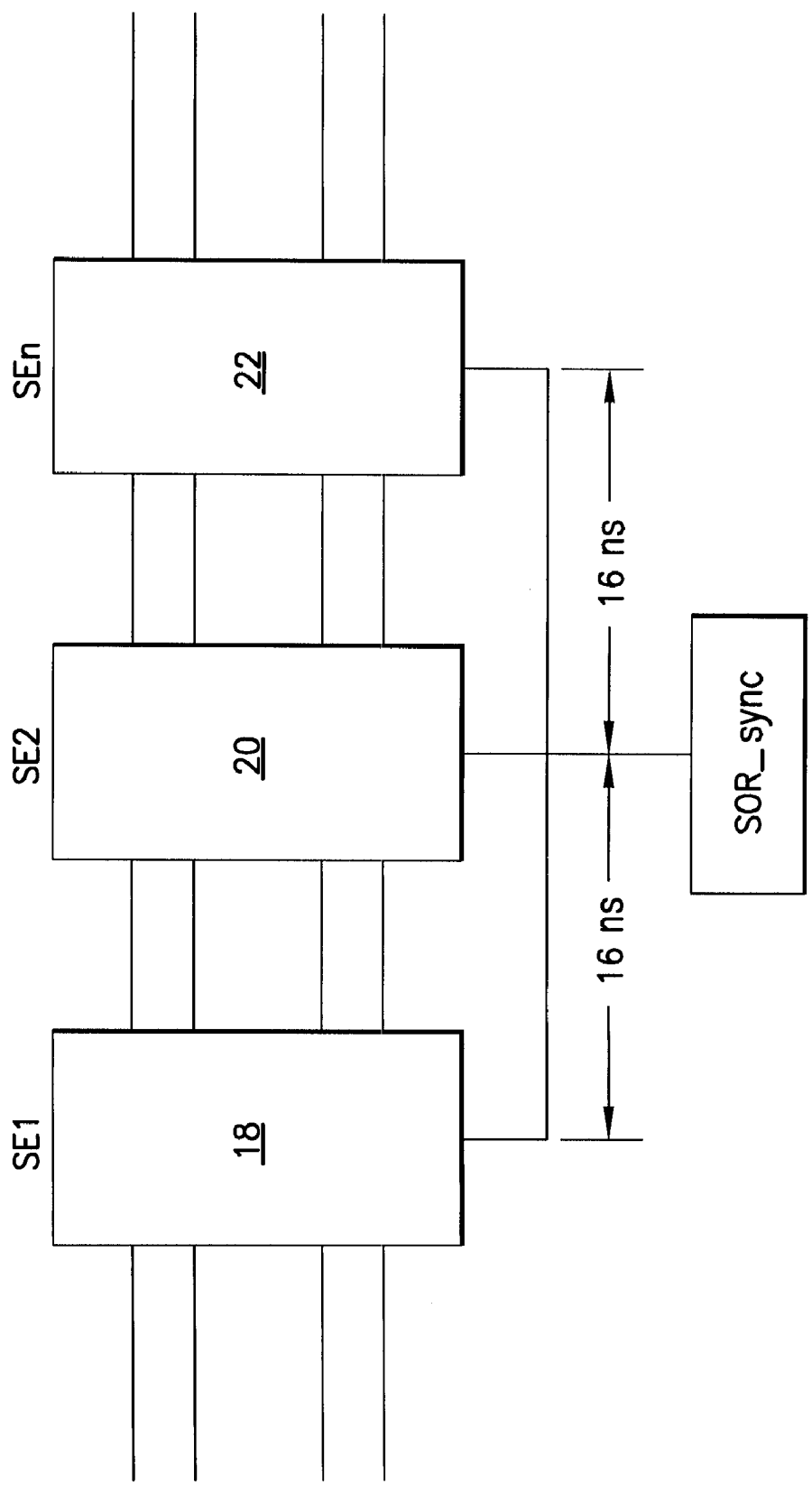
FIG. 6 is a schematic illustration of a worst case difference in the SOR pulse among switch elements.

At the first stage switch element 18, there is a pipeline latency $T_{p1}$ of 18 clock cycles (9 slots) which is equal to 73 ns. Between each stage of the switch (e.g. from switch element 18 to switch element 20 and from switch element 20 to switch element 22) there is a propagation delay $T_{ed\ se-se}$ which is greater than zero and, as described in more detail below with reference to FIG. 6, is no more than 16 ns, depending on how far apart the stages are located on a card or in a shelf.

From the last stage of the switch fabric (e.g. from switch element 22) to the egress service processor (line card) 14 there is an electrical propagation delay $T_{ed\ se-sp}$ which is greater than zero but, as explained below with reference to FIG. 5, no more than 500 ns, depending on how far the service processor (line card) 14 is from the switch card 16.

In addition, within each switch element (18, 20, 22) there is a user definable programmable fill time delay $T_{pft}$. According to the invention, it is possible to allow the request buffers in each of the switch elements to start filling up before any requests are sent out. Although this adds delay to the request message, it ensures that the highest priority requests are forwarded at each stage of the switch fabric. When the request buffer has more than one request waiting to be sent from a switch element, the switch element has the ability to send the requests in order of priority. The requests must be processed in one half row time.

As described in the parent application, Request Elements are 1.5 slots each and PDUs are 16 slots each. The PDUs and Request Elements are interleaved in the frame in a 3-8-3-8 relationship, i.e. two request elements (3 slots) followed by one half PDU (8 slots). Also, it will be recalled that during each row clock cycle, a switch element must input one row and output one row. Since the output row must be provided with a different multiples structure, a certain amount of time must be taken to rearrange the input row into the format of the output row. According to the presently preferred embodiment, this rearrangement can be accomplished within twenty slots.

With the foregoing considerations in mind, according to a presently preferred embodiment, one $T_{pft}$=5.5 slots=45 ns. Thus, the minimum programmable delay leaves enough time for the switch element to choose the requests which will be included in the output row and arrange the row for output before the next row clock cycle. However, 5.5 slots may not include a request element. It is therefore preferred that $T_{pft} \geq 2$, since 11 slots will guarantee that two request elements are buffered. Moreover, although $T_{pft}$ can be set to any value, it is preferably set to a multiple of 2. It will also be appreciated that the value of $T_{pft}$ is equal to the number of request elements to be buffered during the delay.

After the request reaches the egress service processor (line card) 14, the request must be processed. This processing causes a delay $T_{pt\ osp}$ of 16 slots=131 ns.

After the grant is processed, the return trip from the service processor (line card) 14 to the service processor (line card) 12 incurs the same delay as described above. The service processor (line card) 12 must then process the grant which incurs a delay $T_{gdl}$ of 7 grant slots, 114.52 ns.

An example calculation of the round trip delay $T_{hrtpd}$ from request to grant, in a five stage switch fabric with the programmable fill time set to 4, is illustrated in Table 1 where $T_{gmw}$ is the length of the grant message.

TABLE 1

| Factor | Time | Cumulative Time | Notes |
|---|---|---|---|
| Request Path: | | | |
| $T_{ed\ sp-se}$ | 0.500 µs | 0.500 µs | |
| $T_{pl}$ | 0.073 µs | 0.573 µs | |
| Ttotal ed req = $T_{edse} * (N - 1)$ = 0.016 * (5 - 1) | 0.064 µs | 0.637 µs | N = # of Switch fabric Stages, 3 Stage Switch fabric, request direc-tion. |
| Ttotal pft req = $T_{pft} * N$ = 0.180 * 5 | 0.900 µs | 1.537 µs | N = # of Switch fabric Stages, 3 Stage Switch fabric, request direc-tion. |
| $T_{ed\ se-sp}$ | 0.500 µs | 2.037 µs | |
| Grant Path: | | | |
| $T_{pt\ osp}$ | 0.130 µs | 2.167 µs | |
| $T_{ed\ sp-se}$ | 0.500 µs | 2.667 µs | |
| $T_{pl}$ | 0.073 µs | 2.740 µs | |
| $T_{edse} * (N - 1)$ | 0.064 µs | 2.804 µs | N = # of Switch fabric Stages, 3 Stage Switch fabric, grant direc-tion. |
| Ttotal grnt delay = $T_{gdl} * N$ = 114.52 * 5 | 0.573 µs | 3.377 µs | N = # of Switch fabric Stages, 3 Stage Switch fabric, grant direc-tion. |
| $T_{ed\ se-sp}$ | 0.500 µs | 3.877 µs | |
| $T_{gmw}$ | 4.314 µs | 8.191 µs | Grant message length. |
| $T_{hrtpd}$ | | 8.191 µs | Total round trip time. |

According to one embodiment of the invention using optical links between service processors (line cards) and switch elements, the components can be located approximately one kilometer apart with a total round trip delay of approximately 6.7 microseconds. The exact calculation depends on the distance between dual switch fabrics as described below.

Figure 2:
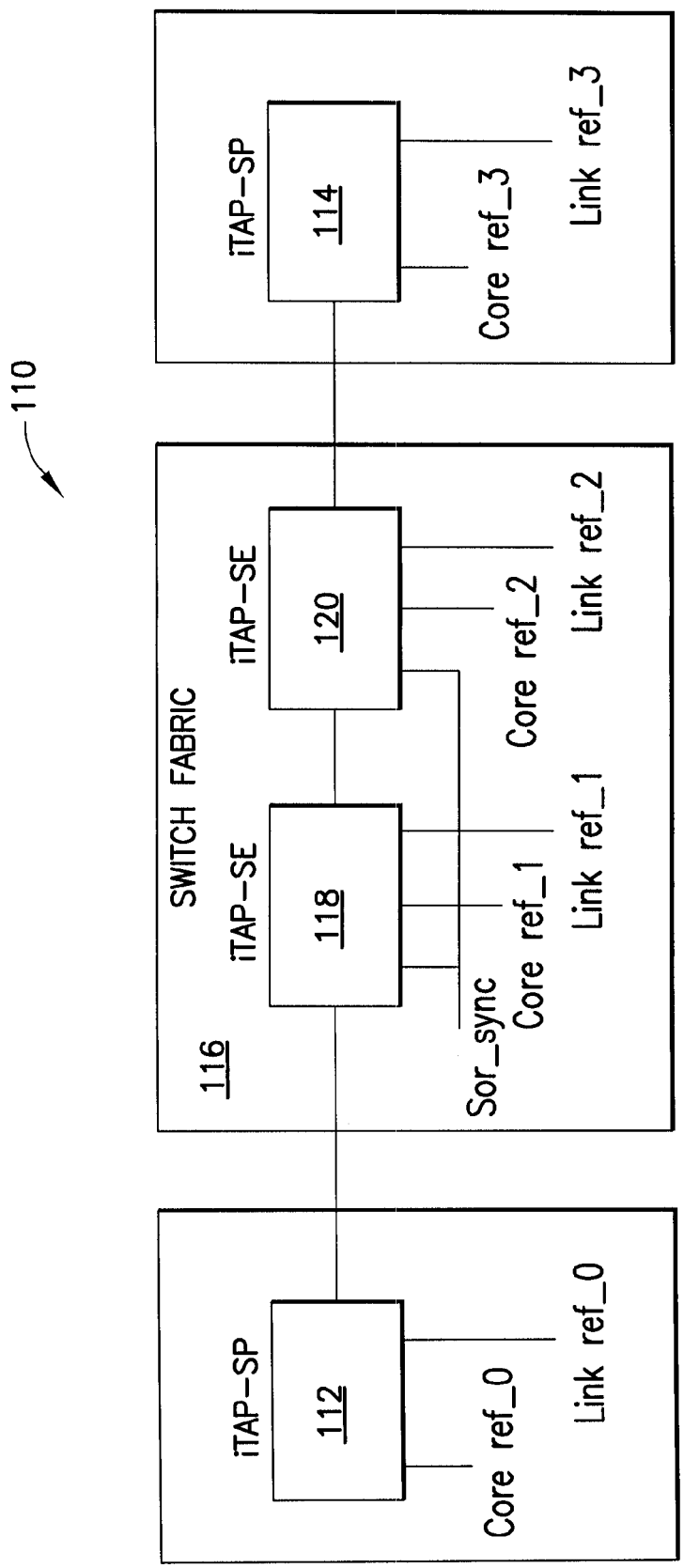
FIG. 2 is a schematic illustration of clock distribution in a switch according to the invention.

Turning now to FIG. 2, the switch 110 is substantially the same as the switch 10 shown in FIG. 1 with similar reference numerals referring to similar parts. The only difference is that the switch 110 is a two stage switch whereas the switch 10 is a three stage switch. According to the invention, each component (service processor (line card) and switch element has a core reference clock and a link reference clock. It is not necessary that all of the components be connected to the same core reference clock or link reference clock. Thus, these clocks are shown in FIG. 2 as Core ref_0, Core ref_1, Core ref_2, Link ref_0, Link ref_1, and Link ref_2. All of the switch elements in the switch fabric 116 are coupled to a single start of row clock (Sor_sync). As described in more detail below with reference to FIG. 6, according to the presently preferred embodiment, the switch elements must be located so that any Sor_sync clock difference does not exceed 16 ns.

According to the presently preferred embodiment, all of the clocks utilize low voltage differential signals (LVDS) according to IEEE Standard 1596.3, 1996. The core reference clock has a selectable frequency of 50 MHz or 62.5 MHz, a stability of at least 100 ppm, a duty cycle of 45/55 (600 ps minimum low) and a maximum phase correction of 1 ps/Cycle. The link reference clock has a frequency of 110.16 MHz, a maximum jitter of 40 ps, a stability of at least 25 ppm, a duty cycle of 45/55 (600 ps minimum low) and a maximum phase correction of 1 ps/Cycle. The SOR clock has a frequency of 72 KHz, a maximum jitter of 1.5 ns, a stability of at least 25 ppm, and a duty cycle of 20 ns minimum low, 20 ns minimum high.

As described in more detail below with reference to FIGS. 5 and 6, null data sent in framing patterns (i.e. idle frames) are transmitted from the service processors (line cards) to the switch elements during initialization. The closest switch element calculates the time difference between the SOR pulse and the time SOR is received from each of the service processors (line cards) and informs each service processor (line card) of the time difference. Each service processor (line card) then aligns itself with the global SOR based on the time difference reported by the switch elements.

Figure 3:
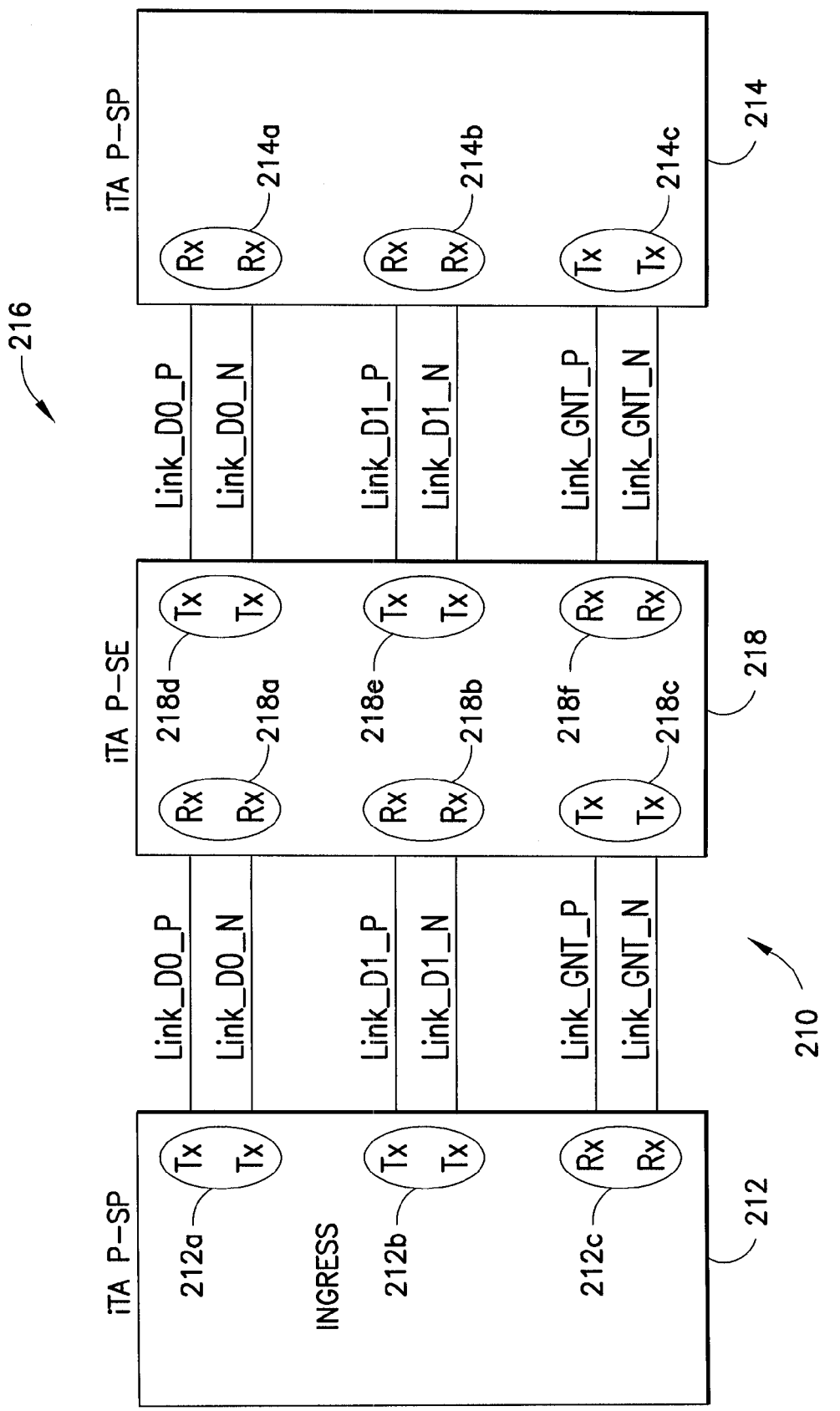
FIG. 3 is a schematic illustration of data channels and grant channels in links according to the invention.

The service processors (line cards) are coupled to the switch elements (and the switch elements coupled to each other) by two serial data channels and one serial link grant channel. Each pair of serial data channels is referred to as a data link. FIG. 3 illustrates a single stage switch 210 according to the invention having at least one ingress service processor (line card) 212, at least one egress service processor (line card) 214, and a switch fabric 216 having at least one switch element 218. The ingress service processor (line card) 212 is provided with two data channel transmitters 212a, 212b and a grant channel receiver 212c. The egress service processor (line card) 214 is provided with two data channel receivers 214a, 214b and a grant channel transmitter 214c. The switch element 218 is provided with a corresponding number of transmitters and receivers 218a-218f which couple to the transmitters and receivers of the service processors (line cards). The use of two data channels provides greater bandwidth. However, a first part of synchronization within the switch is to synchronize each pair of channels. This compensates for any electrical difference between the channels that make up a link. This also places a requirement on the electrical difference between the serial channels that make up a link.

Figure 4:
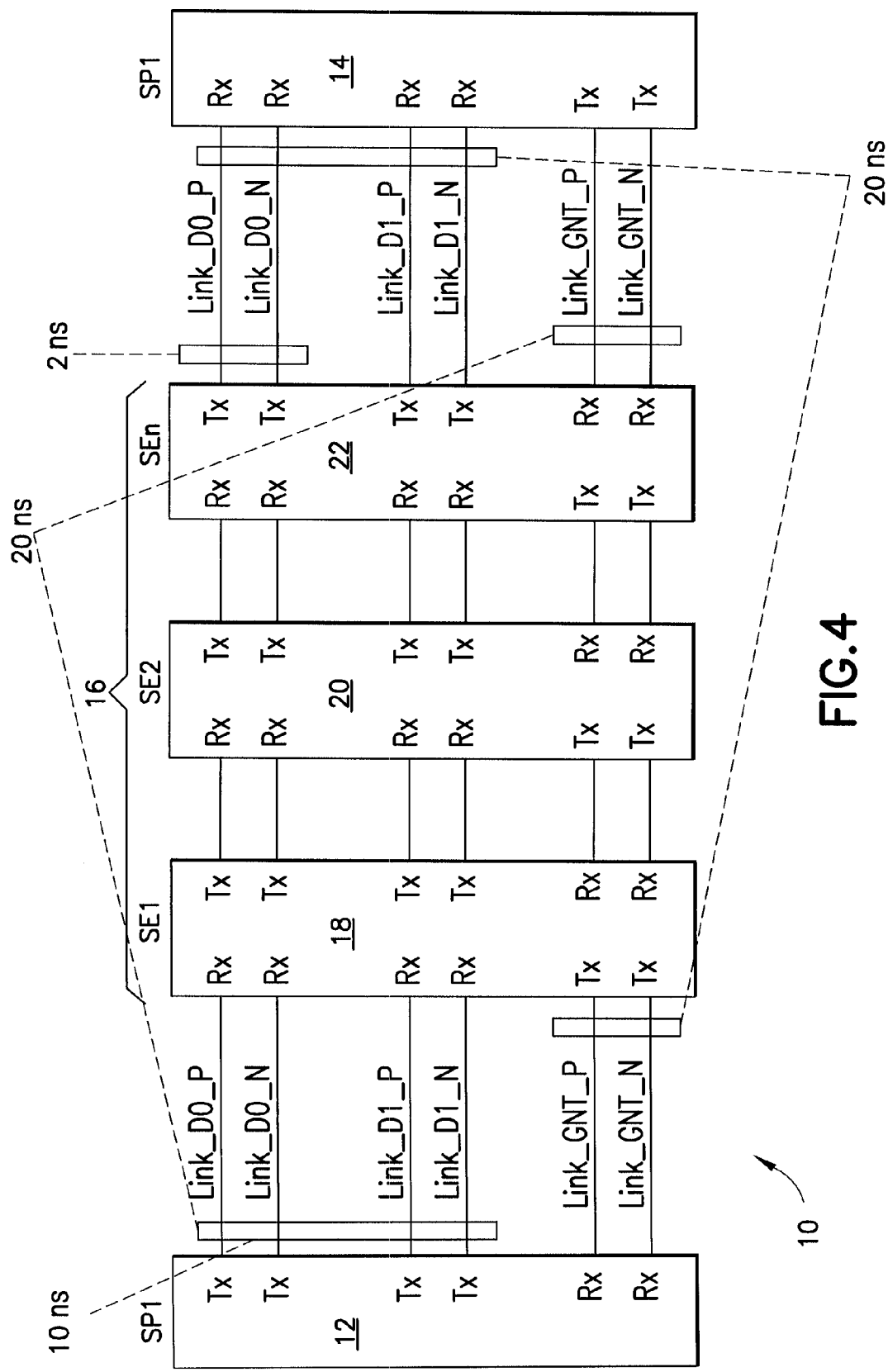
FIG. 4 is a schematic illustration of data-to-data and data-to-grant timing relationships in a switch according to the invention.

FIG. 4 illustrates these timing constraints with reference to the three stage switch 10 initially described in reference to FIG. 1. According to the presently preferred embodiment, the maximum electrical difference between the two data channels in a link must not exceed 10 ns. Moreover, the maximum allowable inter-port skew is 2 ns.

It should be noted that although the Figures illustrate a unidirectional data flow between the service processors and the switch elements, the actual arrangement of service processors and switch elements results in a bidirectional data flow between each service processor and the switch.

The grant lines entering the switch also need to be aligned, but not with the data. The grant lines traveling in the same direction as the data (i.e. ingress with ingress, egress with egress) must be matched in length to the data lines. Although an egress data channel and ingress grant channel logically go together, the skew control must be maintained between data and grant channels that travel the same direction. FIG. 4 illustrates the data to grant timing relationship.

As mentioned above, all of the switch elements, e.g. 18, 20, 22, in a switch fabric 16 according to the invention receive a globally distributed SOR signal which is used to synchronize their start of row timing. The service processors (line cards), e.g. 12 and 14, do not receive such a signal. They are synchronized by the switch elements. At initialization each service processor (line card) starts its own 72 KHz synchronization counter and begins transmitting idle frames on its data links. The switch element logic then synchronizes to the framing patterns on the data links. There is a valid region centered about the switch_sor_signal in which it is acceptable to have a service processor (line card) start of row. If the framing pattern received by the switch element does not exhibit an SOR within acceptable limits, the service processor (line card) is adjusted by the switch element. The switch element measures the difference between the switch element SOR and the start of row received from the service processor (line card) and records the difference. The measured difference is then transmitted to the service processor (line card) by the switch element. The switch element transmits this difference by offsetting the SOR of the data flowing from the switch element to the service processor. The service processor (line card) then aligns itself using this difference. Thus, it is possible for the service processors (line cards) to be remotely located from the switch fabric. This however is limited by the constraints discussed above with reference to FIG. 1.

Figure 5:
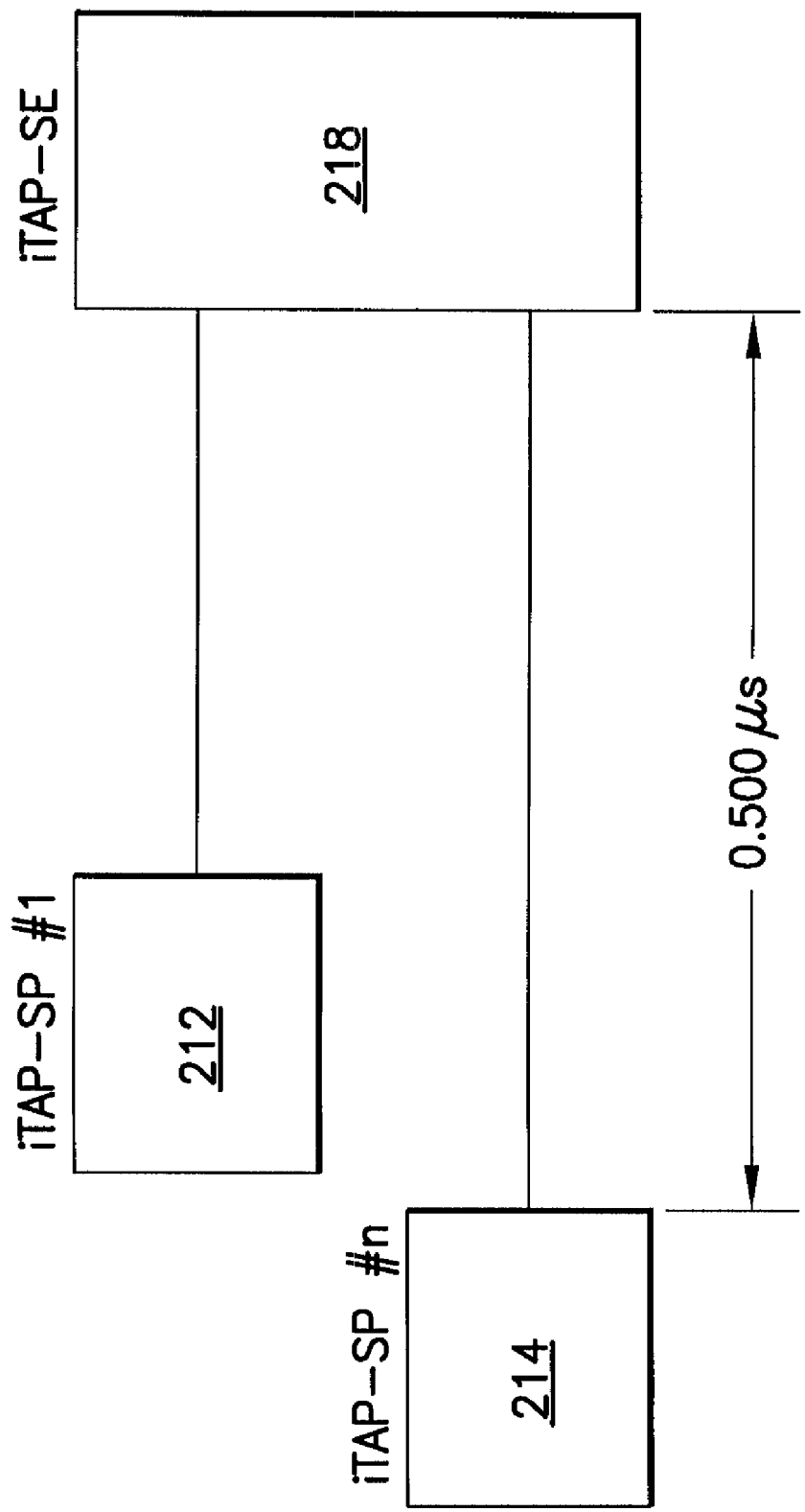
FIG. 5 is a schematic illustration of the maximum allowable electrical delay between a service processor (line card) and a switch element in a switch fabric according to the invention.

FIG. 5 illustrates the maximum allowable electrical delay between a service processor, e.g. 214, and a switch element, e.g. 218. From the foregoing those skilled in the art will appreciate that because the service processor (line card) aligns itself to the first switch element in a switch fabric, it is imperative that the channel to channel maximum skew of 20 ns be observed.

The grant lines will synchronize in a fashion very similar to the data lines. One difference is that there is only one grant input per port. Channel synchronization, therefore, is not required.

FIG. 6 illustrates the synchronization among switch elements, e.g. 18, 20, 22 which depends on the synchronization of the switch start of row SOR_sync signal. The architecture of the switch according to the invention requires row data to move across the switch fabric in lock step fashion. During each row time (72 KHz), a switch element transmits the previous row of data and receives the next row of data. All switching within each switch element is based on the assumption that the input row data is slot aligned prior to switching. To achieve global synchronization, a globally distributed synchronization pulse, SOR_sync, is provided to all switch elements. SOR_sync is a 72 KHz signal. According to the invention, all of the switch elements receive the SOR_sync pulse within 16 ns of each other as shown in FIG. 6.

Figure 7:
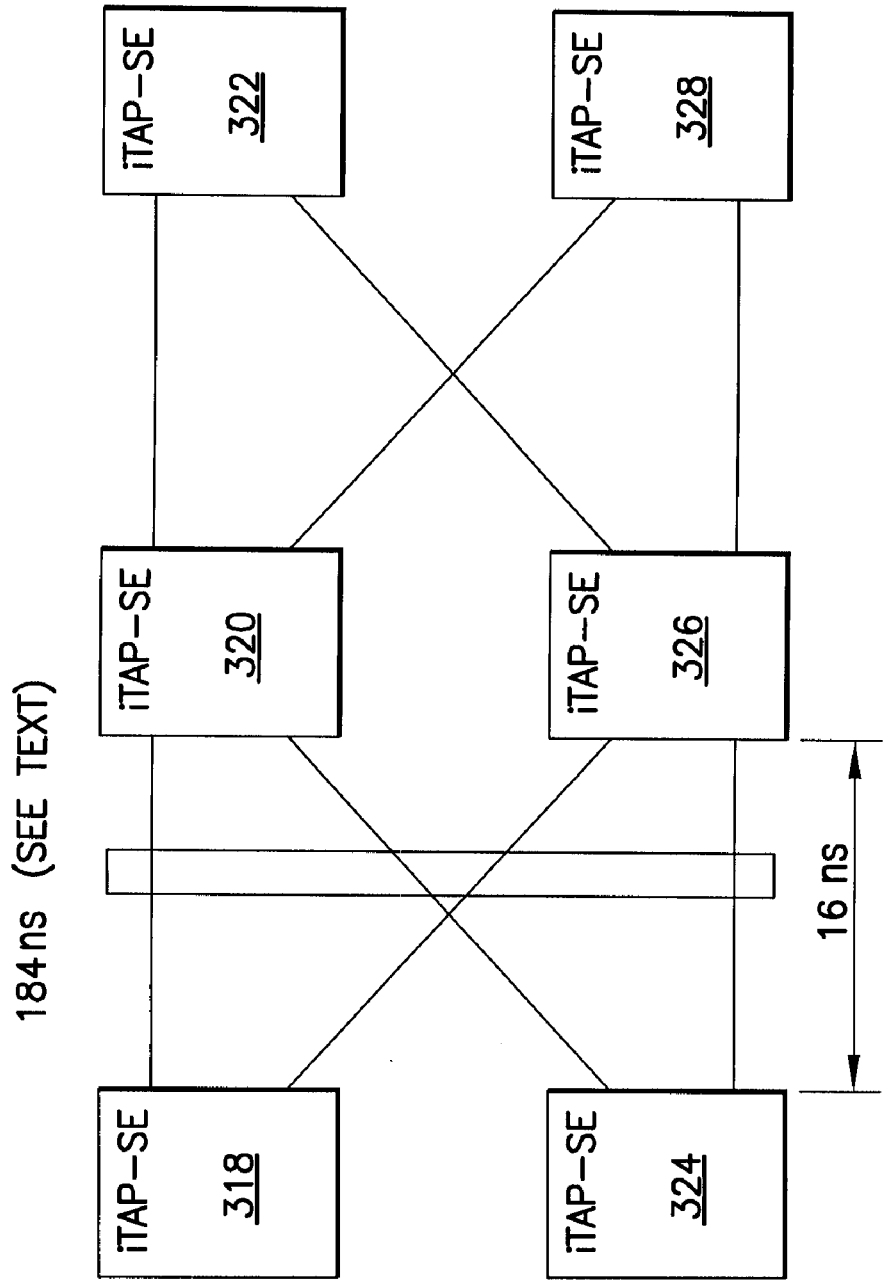
FIG. 7 is a schematic illustration of a worst case electrical delay from any data channel pair.

FIG. 7 illustrates a three stage switch fabric according to the invention having six switch elements 318, 320, 322, 324, 326, 328. Since the SOR_sync is permitted to vary within 16 ns difference among switch elements, row data arriving at a switch element will not necessarily be slot aligned. In addition, there are other possible electrical differences which arise from the routing of the serial data lines between switch elements. According to the presently preferred embodiment, in addition to the 16 ns limit on SOR_sync differences, the worst case electrical delay from a transmitting device to a receiving device must not exceed 16 ns and the worst case electrical delay from any data channel pairs is 184 ns.

The presently preferred default Link Overhead size is twenty slots. Sixteen of those twenty are needed for the data to propagate through the buffers and switch element assuming no flight time for data and all the clocks and the SOR_sync signal are perfectly synchronized between switches. The remaining four slots are used to cure all skews. Thus with 8.17 ns/slot the maximum value for switch element to switch element data channel skew without affecting bandwidth is 32 ns. For every additional 8 ns delay added, 1 slot in the row is needed to be used for added link overhead. The value of 184 ns reduces the number of slots available for traffic in a row by about 23 slots.

As described in the parent application, a switch according to the invention preferably has two independent switch fabrics. Each service processor (line card) is coupled to both switch fabrics, but only one switch fabric is active at any time. If one switch fabric fails or needs to be taken out of service, the other switch fabric takes over. According to the present invention, it is not necessary, but it is preferable, that the two switch fabrics be aligned to a single SOR clock.

Figure 8:
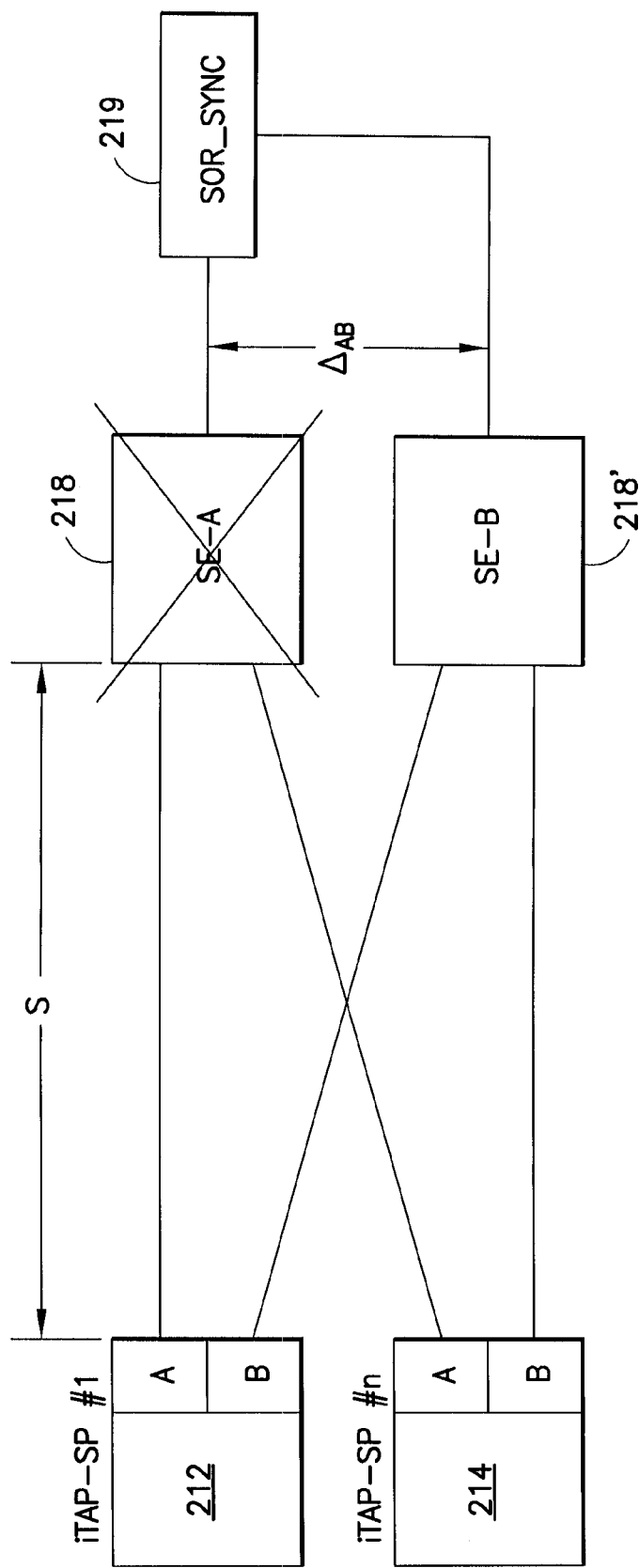
FIG. 8 is a schematic illustration of the removal of one redundant switch fabric from a switch having a single SOR clock.

FIG. 8 illustrates a switch having two switch fabrics 218 and 218' coupled to a single SOR_sync clock where the "A" switch fabric 218 is about to be taken out of service as indicated by the X. There is no need to phase shift the SOR pulse for one fabric. The service processor (line card) ports A and B align themselves independently with the respective switch SOR by using information provided by the switch element. Thus, there is no need for the fabrics and service processors (line cards) to be frequency locked. Each may have their independent clock sources.

The maximum system span "S" (distance between a service processor (line card) and the switch fabric) is calculated according to Equation (1) which takes into account the round trip propagation delay $T_{hrtpd}$ described above, the fiber optic cable time budget $T_{fob}$, the SOR difference $\Delta_{AB}$ between the switch fabrics, and the row time $T_{ROW}$.

$$T_{hrtpd}+T_{fob}+\Delta_{AB} \leq T_{ROW} \tag{1}$$

With a five stage switch fabric, the maximum system span is 1,140 meters if the switch fabrics are equidistant from the same SOR clock. If the difference between the switch fabrics SOR is 1,000 nanoseconds, the maximum span is 940 meters. This is based on the following boundary conditions: 0 m<$\Delta_{AB}$<200 m, 0 ns<$\Delta_{AB}$<1,000 ns, and $T_{ROW}$=13,890 ns.

As mentioned above with reference to FIG. 8, there may be instances which require the switching over of traffic from the fabric 218 to the fabric 218' without any adverse effect on the traffic throughput. The recommended procedure for transferring traffic from fabric 218 to fabric 218' is as follows: startup the 218' fabric, lock the B ports of the service processors (line cards) 212, 214 to the fabric 218', switch the traffic to the 218' fabric, and remove the 218 fabric. This procedure is only limited by the maximum $\Delta_{AB}$ of 200 m (about 1,000 ns).

Figure 9:
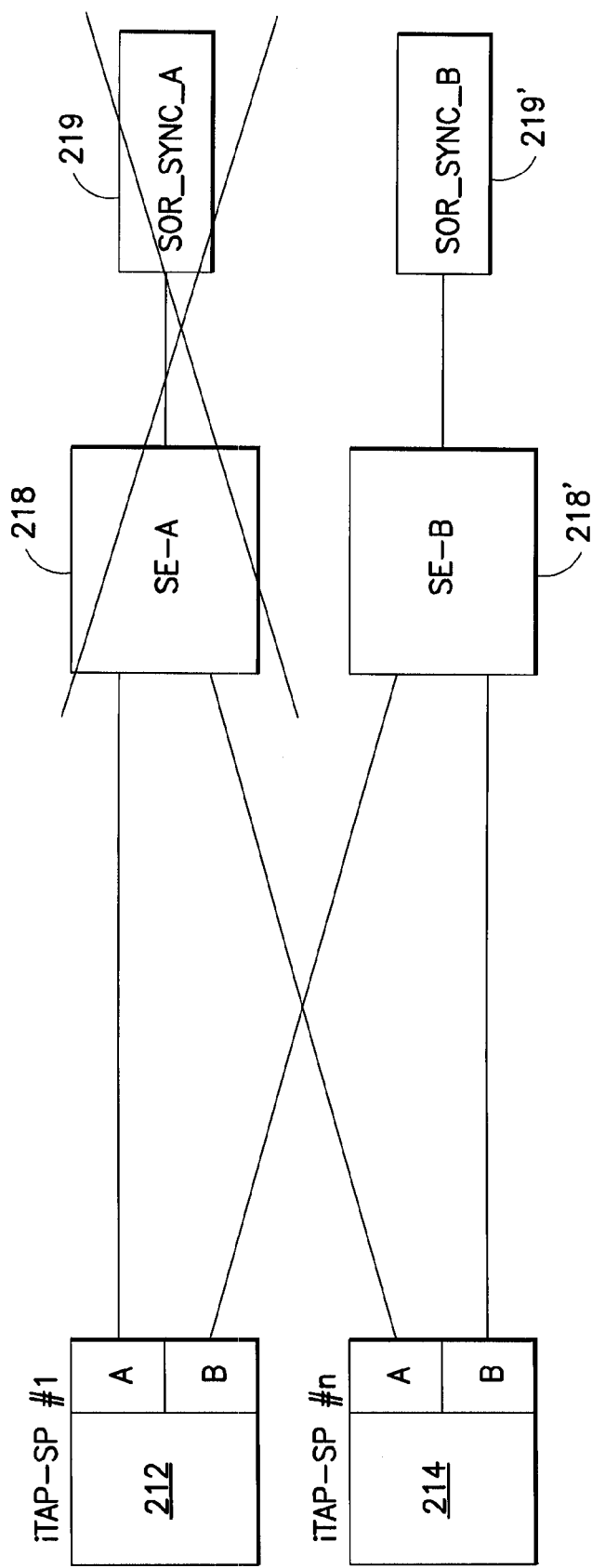
FIG. 9 is a schematic illustration of the removal of one redundant switch fabric from a switch having two SOR clocks.

According to an alternate embodiment of a switch according to the invention shown in FIG. 9, the switch fabric 218 has a SOR_sync clock 219 and the switch fabric 218' has a different SOR_sync clock 219'. In a system with two SOR_sync sources, the service processors (line cards) can be locked to only one of the two. A changeover from fabric 218 to 218' will also require a changeover from SOR_sync clock 219 to 219'. There are two possible procedures for switching to the alternate fabric and clock.

One possible procedure is illustrated by the X in FIG. 9. Fabric 218 and clock 219 are taken out of service and all traffic is transferred to fabric 218' with clock 219'. Each service processor (line card) 212, 214 needs to be reprogrammed to send traffic to the fabric 218'. This requires hundreds of milliseconds and will result in significant traffic loss. It will also requires re-synchronizing each service processor (line card) to the new switch fabric. This will take in excess of 35 row times, at least 500 microseconds. This will also generate substantial traffic loss.

Figure 10:
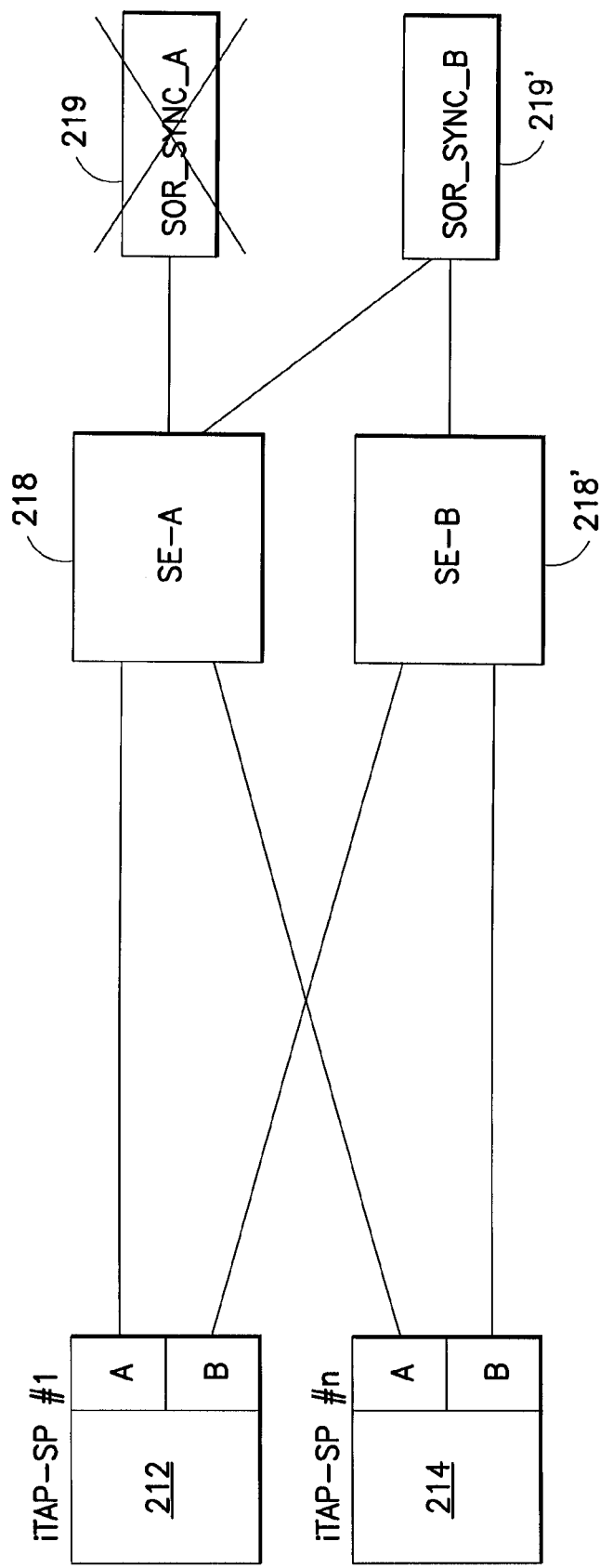
FIG. 10 is a schematic illustration of the removal of one redundant switch fabric and SOR clock from a switch having two SOR clocks.

The presently preferred procedure is illustrated in FIG. 10. According to this procedure, switch fabric 218 is re-synchronized to SOR_sync 219' while traffic is still being directed through switch fabric 218 and SOR_sync 219 is taken out of service. Re-synchronizing switch fabric 218 to SOR_sync 219' can be accomplished within a few row times under software control. After the switch fabric 218 is re-synchronized, the service processors (line cards) 212, 214 can be locked to both switch fabrics 218, 218'. Once the service processors (line cards) are synchronized to both switch fabrics they can be re-programmed to send traffic to either one without traffic loss.

Figure 11:
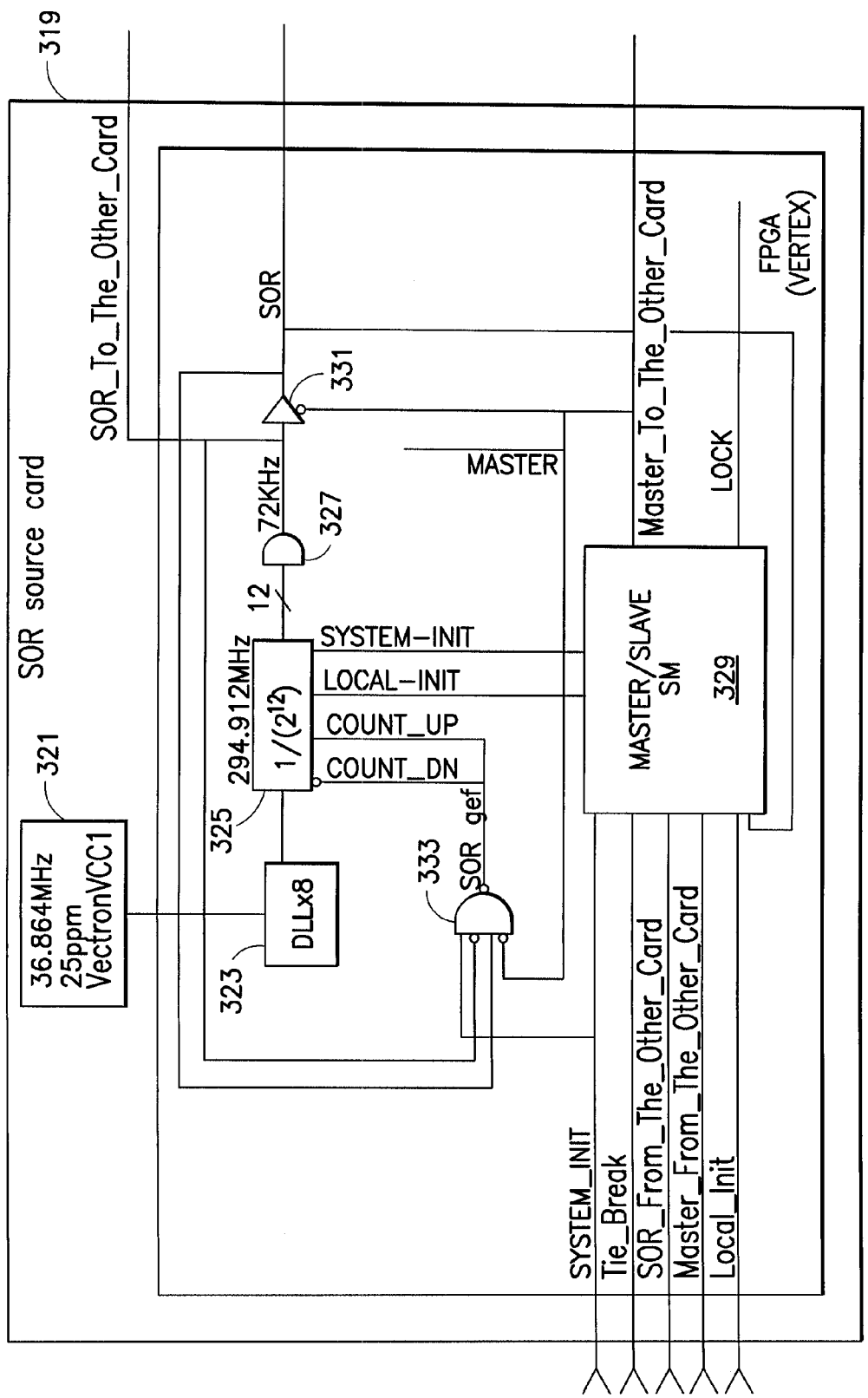
FIG. 11 is a schematic illustration of an SOR clock card according to the invention.

FIG. 11 is a schematic illustration of an SOR source card which can be utilized with another identical or similar cards to implement a redundant source of SOR_sync. The card 319 is based on the Virtex™ FPGA (field programmable gate array) from Xilinx, Inc., 2100 Logic Drive, San Jose, Calif. 95124-3400. The Vectron™ clock generator 321 provides a 36.864 MHz (72 KHz*512) source clock. Using the internal DLLs 323 this clock is multiplied by 8 to provide the 294.912 MHz internal clock. This frequency is divided by 4096 (by counter 325) to provide the 72 KHz SOR frequency. The reason the frequency is multiplied before it is divided is to obtain a high resolution of SOR adjustment (approximately 3 ns). One of the states of the counter 325 is selected (by gate 327) and is used to generate the SOR pulse with 60 ns duration.

The card 319 also includes a master/slave state machine 329, a master control switch 331, and an SOR adjustment gate 333. The master/slave state machine 329 receives six signals and produces two signals. The received signals are:

SYSTEM_INIT, a system-wide signal generated by the management card (system controller) when the entire system is being powered up or reset;

tie_break, a system-wide signal generated by the management card when the entire system is being powered up or reset in order to determine which SOR card will function as master;

Local_Init, an initialization signal generated locally when the SOR card only is being powered up or reset;

SOR_From_The_Other_Card, the internal SOR pulse on the complimentary SOR card wired to this card's connector. This signal is not delivered to the fabric unless the other card is in master mode as described below; and Master_From_The_Other_Card, the internal master signal on the complimentary SOR card wired to this card's connector.

The signals produced by the state machine 329 are:

Master_To_The_Other_Card, this card's internal master signal wired to the complimentary SOR card's connector; and Lock (for hot insertion).

The card 319 produces two other signals:

SOR_To_The_Other_Card, this card's internal SOR pulse wired to the complimentary SOR card's connector; and SOR, the SOR pulse to the fabric.

Figure 12:
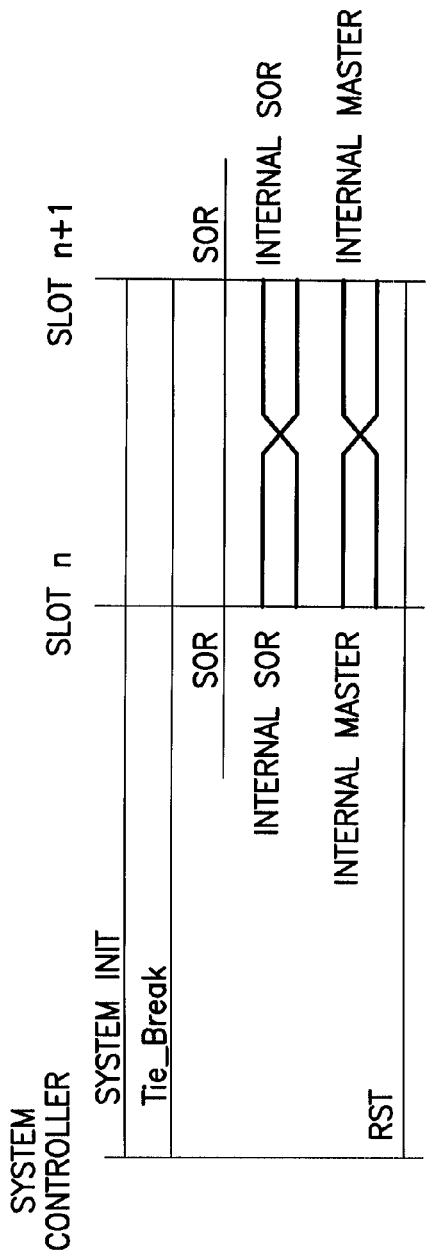
FIGS. 12-16 are timing diagrams illustrating the operation of two SOR clocks according to the invention.

FIG. 12 illustrates a backplane routing suggestion for coupling signals to the two SOR cards which are co-located in the same chassis, preferably in adjacent slots in order to minimize intercard propagation delays. Each card is running independently on its own clock. One is "hot" and the other is "standby". Each card receives the SYSTEM_INIT, Tie_Break and reset RST (Local_Init) signals from the system controller. Each card supplies the internal SOR and internal Master signals to its counterpart. The hot card drives the SOR signal when in the Master state; and the standby card drives the SOR signal when it is in the Master state.

In a steady state the master card is free running and provides the SOR pulse to the fabrics. The backup card tracks the master card by comparing its own (internal) SOR to the one observed on the bus. Any time the internal SOR is skewed relative to the SOR on the bus the counter is decrementing therefore reducing the skew. The check and decrement happens only during the SOR pulse which results in approximately 6 microseconds necessary to lock the SORs from the worst case skew of 7 microseconds.

Other than normal operation, there are two other modes of operation of the cards. One mode is when the entire system (service processors (line cards), switch elements, SOR cards, and controller card) powers up, i.e. when everything is installed and power is applied. The other mode is when one of the cards malfunctions, the other card takes over, the first card is removed and then sometime later is re-installed.

Figure 13:
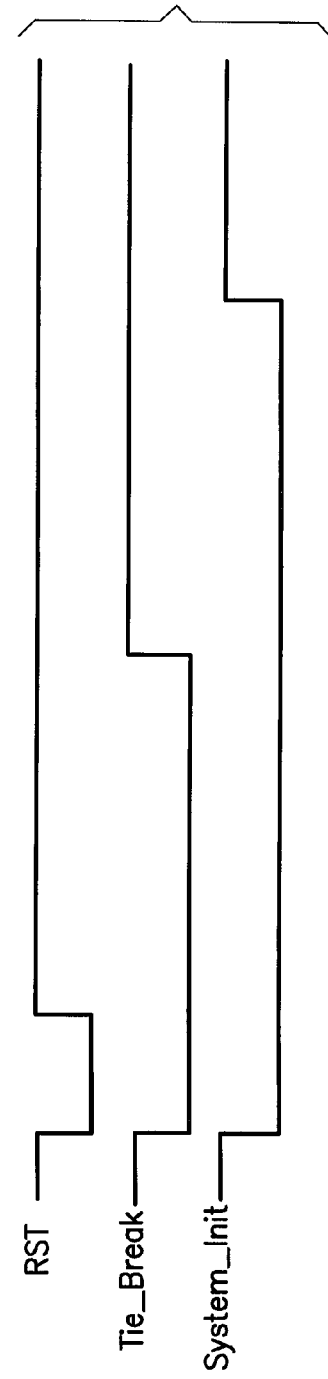
Figure 14:
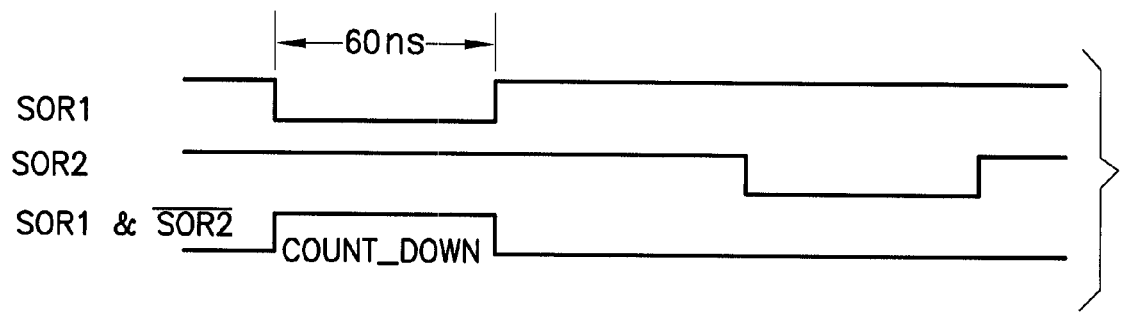
Figure 15:
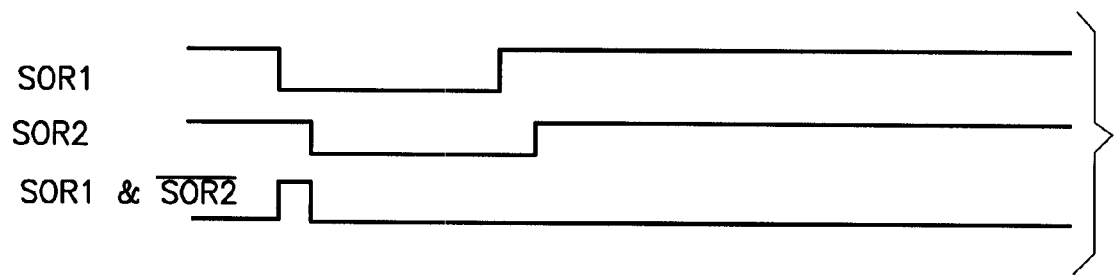
Figure 16:
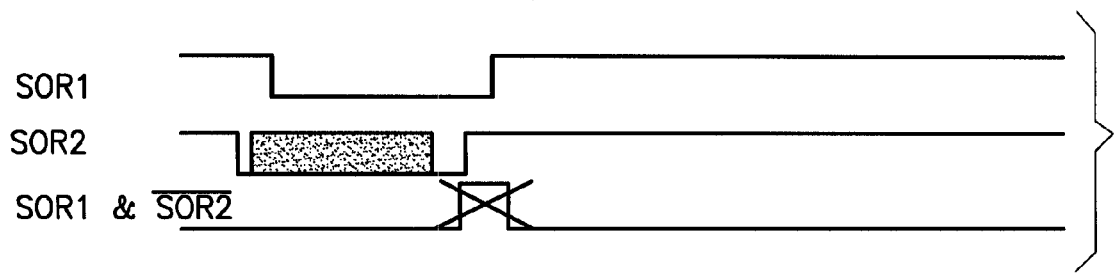

During power-up, the relationship between the system-provided signals is assumed to be as shown in FIG. 13. After the power up reset (RST) there should be sufficient time provided in order to break the symmetry and assign one of the cards to be a master (i.e. to drive the SOR line) and the other to become a slave (or enter the standby mode). This is illustrated in FIG. 13 by the duration of the Tie_Break pulse which is substantially longer than the RST pulse. After this there should be sufficient time to complete the initialization. This is illustrated in FIG. 13 by the duration of the System_Init pulse which is substantially longer than the Tie_Break pulse. The actual duration of these pulses depends on the system and should be defined by system designers.

The tie breaker function is based on the following observations. If two SOR generators are not started simultaneously, then the largest possible phase difference between them is ½ of the period or 7 us. Since the counters are used to generate the SOR from the same frequency, sampling the counter during the SOR from the other card will provide the phase difference between the cards. Since the sum of the distances equals 14 us—one will necessarily be closer than the other. The only exception are two cases when the two SORs are completely overlapping or exactly 7 us apart. However even in those cases, given some time, the pulses will drift apart due to the differences in source clock generators. Therefore it is sufficient to sample the counters MSB during the "other" SOR in order to measure the distance between them. The algorithm suggests that if the measured distance is more than half period (i.e. MSB is set)—the SOR generator enters the slave mode.

During the normal operation the slave card keeps tracking the bus SOR (SOR from the other card) as well as its own SOR. If the bus SOR disappears, the slave card enters master mode and stops tracking. When the failed master card detects activation of the slave's master signal it enters the slave mode. At this point the malfunctioning card should be replaced. When the new card is inserted, it detects the presence of the active master and enters the slave mode.

There have been described and illustrated herein methods and apparatus for phase and frequency drift and jitter compensation in a distributed switch which carries both TDM and packet data. While particular embodiments of the invention have been described, it is not intended that the invention be limited thereto, as it is intended that the invention be as broad in scope as the art will allow and that the specification be read likewise. Thus, while particular examples of timing constraints have been disclosed, it will be appreciated that other timing constraints will apply to a switch where data is transferred in a different manner, in a different frame, or at a different clock rate. Also, while switches having a particular number of stages have been shown, it will be recognized that the invention contemplates switch fabrics having a different number of stages. Moreover, while the invention has been disclosed with only one ingress service processor (line card) and one egress service processor, it will be appreciated that in most applications, a switch according to the invention will have multiple ingress service processors (line cards) and multiple egress service processors (line cards). Furthermore, while the SOR clock generator has been disclosed as based on a particular FPGA, it will be understood that different hardware can achieve the same or similar function as disclosed herein. It will therefore be appreciated by those skilled in the art that yet other modifications could be made to the provided invention without deviating from its spirit and scope as so claimed.

The invention claimed is:

1. A method for arbitrating bandwidth in a communications switch, comprising:
   generating a repeating data frame having a plurality of rows;
   making requests during row N for space in row N+1, where N is an integer;
   buffering a predetermined number of requests; and
   granting one or more of the buffered requests based on priority.

2. A method according to claim 1, wherein:
   said buffering the predetermined number of requests comprises buffering a predetermined even number of requests.

3. A method according to claim 1, wherein:
   x bits of requests are interleaved with y bits of data, where x and y are integers, and said buffering the predetermined number of requests includes setting a buffer fill time to a multiple of x+y bits.

4. A method according to claim 1, wherein:
   the switch is a multistage switch, and
   said buffering the predetermined number of requests is performed at each stage of the switch.

5. A method according to claim 4, wherein:
   the same number of requests are buffered at each stage of the switch.

6. A system comprising:
   a first service processor to generate a repeating data frame having a plurality of rows;
   a switch fabric coupled with the first service processor and having a first switch element configured
   to receive at least a portion of the repeating data frame,
   to buffer, for a predetermined period of time, one or more request elements of the received portion of the repeating data frame, and
   to transmit at least a first request element of the one or more buffered request elements based at least in part on a priority of the first request element, wherein the first request element is in row N of the plurality of rows, where N is an integer, and requests an allocation for row N+1; and
   a second service processor coupled with the switch fabric to receive at least the first request element from the switch fabric, to generate a grant based at least in part on the first request element, and to transmit the grant to the first service processor through the switch fabric.

7. The system of claim 6, wherein the predetermined period of time is based at least in part on an electrical distance between the first service processor and the second service processor.

* * * * *